United States Patent
Takei et al.

(10) Patent No.: US 7,186,029 B2
(45) Date of Patent: Mar. 6, 2007

(54) ROLLING ELEMENT BEARING AND MOTOR

(75) Inventors: Kenji Takei, Kanagawa (JP); Yasuhisa Terada, Kanagawa (JP)

(73) Assignee: NSK Ltd., Tokyo (JP)

( * ) Notice: Subject to any disclaimer, the term of this patent is extended or adjusted under 35 U.S.C. 154(b) by 68 days.

(21) Appl. No.: 10/526,083

(22) PCT Filed: Aug. 29, 2003

(86) PCT No.: PCT/JP03/11112

§ 371 (c)(1),
(2), (4) Date: Feb. 28, 2005

(87) PCT Pub. No.: WO2004/020855

PCT Pub. Date: Mar. 11, 2004

(65) Prior Publication Data

US 2005/0254740 A1    Nov. 17, 2005

(30) Foreign Application Priority Data

Aug. 30, 2002   (JP)   ............................. 2002-253083

(51) Int. Cl.
*F16C 33/58*   (2006.01)

(52) U.S. Cl. ..................... 384/450; 384/492; 384/513

(58) Field of Classification Search ................ 384/450, 384/492, 513, 912, 913
See application file for complete search history.

(56) References Cited

U.S. PATENT DOCUMENTS

| 5,626,974 A | 5/1997 | Mitamura |
| 2002/0001423 A1 | 1/2002 | Tanimoto et al. |
| 2002/0039460 A1 | 4/2002 | Nishimura et al. |

FOREIGN PATENT DOCUMENTS

| DE | 100 24 538 A1 | 1/2001 |
| DE | 100 41 874 A1 | 7/2001 |
| JP | 73116 | 5/1987 |
| JP | 117426 | 9/1990 |
| JP | 2001-90736 A | 4/2001 |
| JP | 2001-41248 A | 12/2001 |
| WO | WO 99/63125 A1 | 12/1999 |

*Primary Examiner*—Lenard A. Footland
(74) *Attorney, Agent, or Firm*—Sughrue Mion, PLLC

(57) ABSTRACT

A rolling bearing for supporting a shaft on which a fan is provided, has an inner ring having an inner ring race on an outer surface thereof, an outer ring having an outer ring race on an inner surface thereof, balls provided between the inner ring race and the outer ring race and a retainer which keeps the balls apart each other in a circumferential direction, wherein an inner diameter of the bearing is set to be 3 mm or more and 17 mm or less, an outer diameter of the bearing is set to be 8 mm or more and 40 mm or less, when a thickness ti and a thickness te satisfies a relationship te$\geq$1.24 ti, and a residual austenite content in the inner ring is 7 wt % or less.

12 Claims, 6 Drawing Sheets

ROLLING ELEMENT BEARING AND MOTOR

FIELD OF THE INVENTION

The present invention relates to a rolling bearing which is preferably used to bear the rotor of a motor such as air conditioner fan motor, air purifier fan motor, cleaner (electric cleaner) motor, car air conditioner fan motor, IC cooling fan motor and kotatsu (Japanese foot warmer with a quilt over it) fan motor.

DESCRIPTION OF THE RELATED ART

A conventional example of a rolling bearing (ball bearing) for use in the above purposes is shown in FIG. 6(A). As shown in the figure, a ball bearing is arranged such that thickness ti and te at a bottom surface of race, which is the thinnest section of inner and outer rings 91 and 93, respectively, are the same taking into account a balance of strength of the inner ring 91 and the outer ring 93.

Japanese Patent Unexamined Publication No. JP-A-2001-90736 proposes that a pitch diameter Dp of ball is sety to be smaller than a sectional center diameter of the bearing as shown in FIG. 6(B) for the purpose of reducing torque.

It is the actual circumstances that in the fan motor or cleaner motor comprising a bearing having an inner diameter of 3 mm or more and 17 mm or less and an outer diameter of 8 mm or more and 40 mm or less, load applied to the bearing is very small. Durability of the bearing is governed by lubrication life of grease enclosed in the bearing. Further, the fan motor is often used particularly in a situation where noise generated from the bearing is offensive.

In the fan motor and cleaner motor, the inner ring of the bearing is mounted on the shaft with fitting allowance (fasten and fit) and the outer ring of the bearing is generally mounted on a housing formed by pressing a steel sheet with clearance (clearance fit). Since precision (roundness, cylindricality, etc.) of holes of the press-formed housing, in which the outer ring of the bearing is fitted, is not so high, the precision of the outer ring of the bearing which has been prepared with substantially complete roundness can be deteriorated by the housing, causing the generation of abnormal noise from the bearing in this case.

Further, temperature of the atmosphere surrounding the bearing of the fan motor occasionally exceeds more than 100° C. under some working atmospheres, etc. The inner ring, which is generally mounted on the shaft with fitting allowance, is made of bearing steel which performed heat treatment step. Thus the inner ring contains residual austenite amount of about 10 wt %. When the inner ring is left in the temperature atmosphere of 100° C. or more for a long time, the austenite is decomposed and converted to martensite to cause the inner ring to expand. Accordingly, fitting between the shaft and the inner ring is changed into clearance fit and generates vibration and noise.

The present invention has been worked out under the circumstances described above and its object is to provide a rolling bearing which has inner and outer diameters and a width corresponding to standard bearing according to ISO specification and can be affected by the effect of precision of holes in housing, etc. so difficultly that abnormal noise, vibration, etc. can be difficultly generated even in a working atmosphere of 100° C. or more.

DISCLOSURE OF THE INVENTION

An object of the present invention is achieved by the following constitutions.

(1) A rolling bearing for supporting a shaft on which a fan is provided, has an inner ring having an inner ring race on an outer surface thereof, an outer ring having an outer ring race on an inner surface thereof, a plurality of balls provided between the inner ring race and outer ring race, and a retainer which keeps the balls apart circumferentially from each other, wherein an inner diameter is set to be 3 mm or more and 17 mm or less and an outer diameter is set to be 8 mm or more and 40 mm or less, when a thickness ti is defined between a bottom surface of the inner ring race and the inner surface of the inner ring, and a thickness te is defined between a bottom surface of the outer ring race and the outer surface of the outer ring, a relationship te≧1.24 ti is satisfied, and a residual austenite content in the inner ring is 7 wt % or less.

(2) Wherein the space inside the bearing is volume which is defined among the inner ring, the outer ring and the sealing member and is excluding the ball and the retainer.

(3) The rolling bearing according to (1) or (2), wherein the outer surface of the inner ring is shaped in substantially cylindrical surface at area thereof except the inner ring race.

(4) The rolling bearing according to any one of (1) to (3), wherein the inner diameter of the bearing, the outer diameter of the bearing and the width of the bearing are the same as the dimension of standard bearing according to ISO.

(5) A motor having the motor rotary shaft supported by a rolling bearing according to any one of (1) to (4).

In the above constitution, by setting the thickness te of the outer ring at the bottom surface of race to 1.24 times or more the thickness ti of the inner ring at the bottom surface of the race, the deformation of the outer ring can be remarkably inhibited because the deformation rigidity of the annular outer ring is proportional to the moment of inertia of area, i.e., fourth power of thickness. Accordingly, even when the bearing is inserted in a hole or the like having not too high a roundness formed by pressing, the outer ring thereof can be difficultly deformed, making it possible to inhibit the generation of abnormal noise from the bearing. In other words, when the outer ring of bearing is deformed following a hole formed by pressing, the surface of the race is deformed (roundness is deteriorated), making it impossible for balls to make smooth revolution and causing the pocket of the retainer and each of the balls to interfere with each other to generate retainer noise offensive to the ear, but this deformation can be prevented in the present embodiment.

It suffices if the relationship te≧1.24 ti is established.

Further, when the residual austenite content (γR) contained in the inner ring is 7 wt % or less, the aging deformation of the inner ring due to volumetric expansion developed when γR undergoes martensitic transformation occurs little, preventing the shaft and the inner ring from making clearance fit to each other, even if the bearing is used in an atmosphere of 100° C. or more for a long time. Accordingly, the generation of vibration or noise due to clearance fit of the shaft and the inner ring to each other can be remarkably inhibited.

In the case where the initial fitting allowance is small, it is more desirable that the content of residual austenite in the inner ring be 3 wt % or less.

FIG. 5 depicts a graph illustrating the relationship between the elapsed time (decomposition time of residual austenite) in the working atmosphere of ambient temperature of 20° C. and the dimensional change ratio shown when the residual austenite contained in the inner ring of the bearing incorporated in a motor is 10 wt % (Comparative Example), 7 wt % (Embodiment Example 1) and 3 wt % (Embodiment Example 2). When the operating time of the motor reaches 25,000 hours, Embodiment Example 1 shows a dimensional change ratio of about half that of Comparative Example. Embodiment Example 2 shows a dimensional change ratio of one fourth or less of that of Comparative Example.

Further, by enclosing grease in the space inside the bearing to employ grease lubrication in addition to provision of a sealing member on the outer ring, the prolongation of the life of the bearing can be realized.

As the grease there may be used a urea-based grease. By using a urea-based grease, the entrance of foreign matters in the space inside the bearing can be remarkably inhibited. Grease including a urea-based thickening agent can easily harden on the surface thereof as compared with grease including a lithium soap-based thickening agent or the like and thus forms a bank in the vicinity of the shoulder of the inner ring race when discharged from the inner ring race. This bank can remarkably prevent the entrance of foreign matters such as dust and powder produced by abrasion of brush of DC motor.

Further, by shaping the area of the outer surface of the inner ring except the inner ring race into substantially cylindrical surface, the width dimension (thickness) of the side of the inner ring can be assured. In this arrangement, the elimination of fretting with the shoulder of the shaft, the enhancement of the incorporatability into the shaft (countermeasure against Brinell indentation), etc. can be made. The term "substantially cylindrical surface" as used herein is meant to include the case where an unevenness or step is provided on the outer surface of the inner ring so far as the width dimension of the side of the inner ring is not substantially reduced. For example, in the case where a U-shaped groove is provided on the outer surface of the inner ring at the area thereof, which radially opposed to the forward end of the sealing member, or the axial end of the outer surface of the inner ring is somewhat chamfered, it is regarded as substantially cylindrical surface.

Further, by setting the inner diameter of the bearing, the outer diameter of the bearing and the width of the bearing identical to the dimension of standard bearing according to ISO, the mounting of the bearing or the motor having this bearing incorporated therein on other mounting sites (shaft or housing) can be made by the existing tools without any necessity of changing the dimension of the mounting sites. When the inner diameter of the bearing, the outer diameter of the bearing and the width of the bearing are set to be specific dimension, it is necessary that special tools be prepared, leading to cost rise, but the above described arrangement can prevent such a cost rise.

The motor having its motor rotary shaft supported by the rolling bearing having the above arrangement operates with low noise and vibration and maintains its performance for a long time even in the working atmosphere of 100° C. or more. Motor rotary shafts include rotary shaft connected to the motor shaft besides the motor shaft.

BEST MODE FOR CARRYING OUT THE INVENTION

Figure 1:
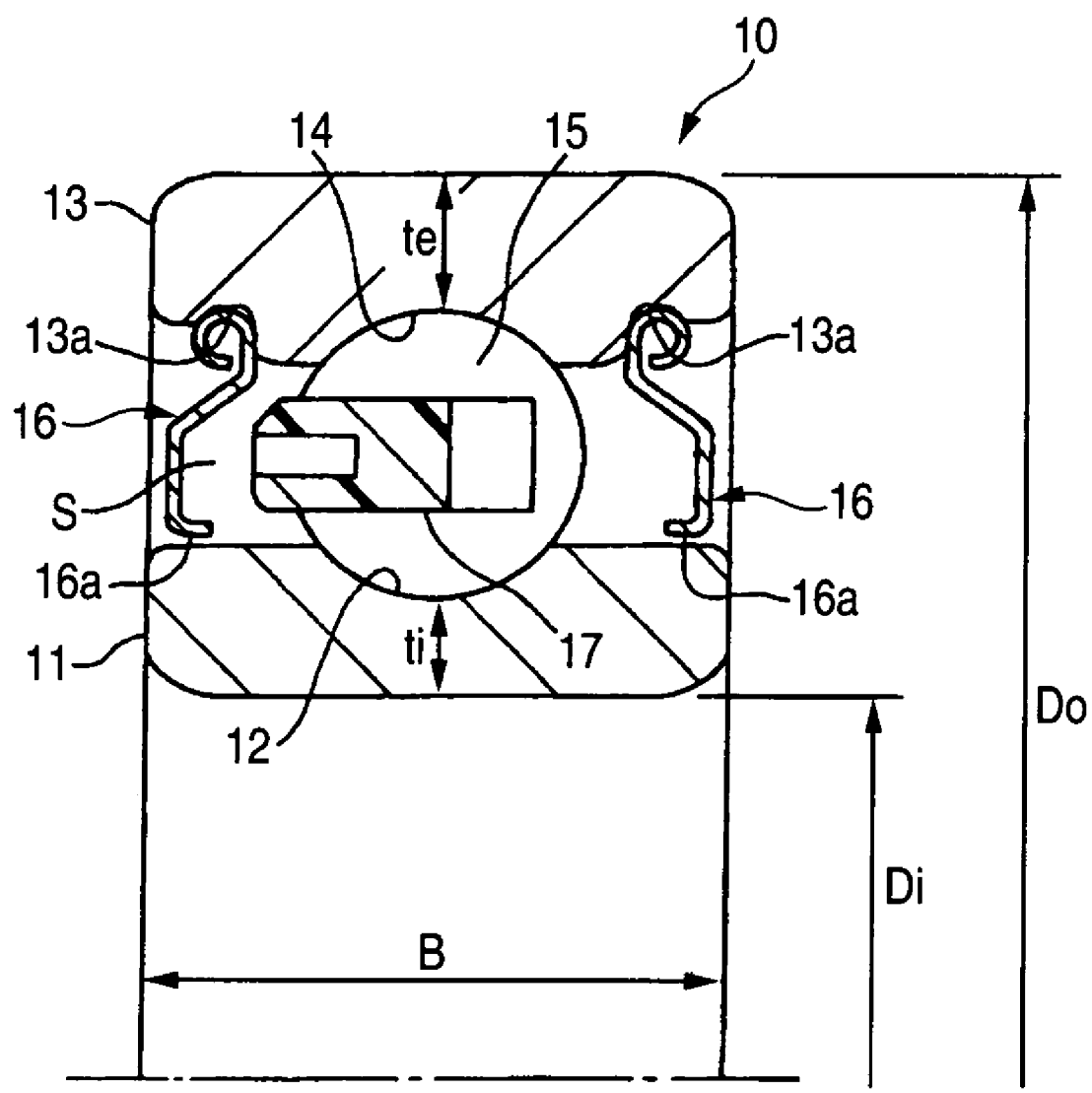
FIG. 1 is a sectional diagram illustrating a rolling bearing according to a first embodiment of the present invention.

Embodiments of the present invention will be described in detail hereinafter in connection with the drawings. A rolling bearing (ball bearing) 10 of the first embodiment shown in FIG. 1 is arranged to have a plurality of balls 15 provided interposed between an inner ring 11 and an outer ring 13. The pluralities of balls 15 are retained apart circumferentially from each other at an equal interval by a retainer 17 (crown-shaped retainer made of a resin herein). Shields 16, 16 are provided on the respective axial side of the ball 15 as sealing members. The shields 16, 16 each are fixed to an interior of a groove 13a formed in the outer ring 13 at the outer portion thereof and are opposed to the outer surface of the inner ring 11 in non-contact manner with the inner surface thereof. A grease is enclosed in space S of the bearing.

An inner ring race 12, which is groove of an arc shape in sectional view, is provided at an axially central portion of the outer surface of the inner ring 11. An outer ring race 13, which is groove of an arc shape in sectional view, is provided at an axially central portion of the inner surface of the outer ring 13.

Thickness te of the outer ring 13 at the bottom of the groove of the outer ring race 14 is predetermined to be 1.24 times or more thickness ti of the inner ring 11 at the bottom of the groove of the inner ring race 11, and te is set to be equal to 1.47 ti in the present embodiment.

The inner diameter Di of the bearing is set to be 3 mm or more and 17 mm or less and the outer diameter Do of the bearing is set to be 8 mm or more and 40 mm or less. The inner diameter Di of the bearing, the outer diameter Do of the bearing and the width B of the bearing are set to be identical to the dimension of standard bearing according to ISO.

For example, the following combinations of dimension are employed.

(1) Inner diameter Di of bearing=3 mm, outer diameter Do of bearing=8 mm and width B of bearing=3 mm (2) Inner diameter Di of bearing=5 mm, outer diameter Do of bearing=13 mm and width B of bearing=4 mm (3) Inner diameter Di of bearing=8 mm, outer diameter Do of bearing=22 mm and width B of bearing=7 mm (4) Inner diameter Di of bearing=12 mm, outer diameter Do of bearing=32 mm and width B of bearing=10 mm (5) Inner diameter Di of bearing=17 mm, outer diameter Do of bearing=40 mm, width B of bearing=12 mm In the present embodiment, the combination of dimension (3) is applied.

The inner ring 11 and outer ring 13 are prepared in such an arrangement that the content of residual austenite is 7 wt % or less. In the present embodiment, the content is set to be 3 wt % or less.

In the present embodiment, the area of the outer surface of the inner ring 11 except the inner ring race 12 is shaped in cylindrical surface. A bent portion 16a extending toward the ball 15 is provided at the forward end (inner portion) of the shields 16, 16. The bent portion 16a is disposed substantially parallel to the outer surface of the inner ring 11 with a minute clearance provided therebetween to form a labyrinth. In this arrangement, leakage of the grease is prevented.

Grease comprising base oil and thickening agent including a urea compound is used.

The base oil for the grease is not specifically limited, but an ester oil, hydrocarbon oil or mixture thereof are preferred taking into account lubricity in high speed rotation, heat resistance, etc. Examples of the hydrocarbon oil, poly-α-olefins such as normal paraffin, isoparaffin, polybutene, polyisobutyrene, 1-decene oligomer and co-oligomer of 1-decene with ethylene, etc are acceptable. Examples of the ester oil include diester oils such as dibutyl sebacate, di-2-ethylhexyl sebacate, dioctyl adipate, diisodecyl adipate, ditridecyl adipate, ditridecyl tallate and methyl acetyl sinolate; aromatic ester oils such as trioctyl trimellitate, tridecyl trimellitate and tetraocyl pyromellitate; polyol ester oils such as trimethylol propane caprylate, trimethylol propane peralgonate, pentaerythritol-2-ethyl hexanoate and pentaerythritol peralgonate, ester carbonate oils, etc.

In addition, aromatic base oils, ether-based oils, etc. may be mixed as necessary. Examples of the aromatic oils include alkyl naphthalene oils such as monoalkyl naphthalene, dialkyl naphthalene and polyalkyl naphthalene. Examples of the ether-based oils include polyglycols such as polyethylene glycol, polypropylene glycol, polyethylene glycol monoether and polypropylene glycol monoether; phenyl ether oils such as monoalkyl triphenyl ether, alkyl diphenyl ether, dialkyl diphenyl ether, pentaphenyl ether, tetraphenyl ether, monoalkyl tetraphenyl ether and dialkyl tetraphenyl ether, etc. Further, mineral oils can be used, and those which have been subjected to purification such as distillation under reduced pressure, lubricant deasphalting, solvent extraction, hydrogenation-decomposition, solvent dewaxing, sulfuric acid-rinsing, clay purification and hydrogenation-purification may be used.

Further, as the urea compound which in the thickening agent, aurea compound having from 2 to 5 urea bonds per molecule (diurea, triurea, tetraurea, pentaurea) is particularly preferred. As the number of urea bonds per molecule increases, the heat resistance raises, giving a tendency for prolongation of the durable life of the bearing. However, when the number of urea bonds per molecule is 6 or more, it is disadvantageous in that the grease can easily harden.

The thickening agent, i.e., the above described urea compound is preferably incorporated in an amount of from 9 to 18.5 wt % based on the total weight of the grease. It is particularly preferred that the urea compound be incorporated in an amount of from 10 to 15 wt % based on the total weight of the grease. When the amount of the urea compound to be incorporated falls below 9 wt %, the resulting capability of retaining base oil is not sufficient, causing the separation of a large amount of oil content and the leakage of grease at one time during the initial stage of rotation and leading to the reduction of the durable life of the bearing. On the contrary, when the amount of the urea compound to be incorporated exceeds 18.5 wt %, the amount of the base oil decreases relatively, causing early shortage of lubrication and leading to the reduction of the durable life as in the aforementioned case.

Further, the grease preferably includes at least one of amine-based oxidation inhibitor and phenolic oxidation inhibitor incorporated therein in an amount of 0.05 to 4 wt %, particularly from 0.1 to 4 wt %. Among oxidation inhibitors, amine-based oxidation inhibitors and phenolic oxidation inhibitors are preferred in view of affinity for the urea compound. When the amount of these oxidation inhibitors to be incorporated falls below 0.05 wt %, sufficient oxidation inhibiting properties cannot be obtained and no great difference in durable life of bearing for example from that in the case where no oxidation inhibitor is added is shown. Further, when these oxidation inhibitors are incorporated in an amount of more than 4 wt %, the enhancement of effect corresponding to the increase of the added amount of these oxidation inhibitors cannot be attained, giving poor economy. Moreover, since the amount of base oil and thickening agent decreases relatively, it is likely that the durability life of lubrication can be adversely affected.

As the amine-based oxidation inhibitors there may be exemplified thiodiphenylamine, etc. As the phenolic oxidation inhibitors there may be exemplified 2,6-di-t-butyl-4-methylphenol, etc.

Further, the above grease may include a rust preventive, an oil-based agent, an extreme-pressure agent, etc. incorporated therein as necessary. All these additives may be known. The content of these additives to be incorporated are preferably each 0.05 wt % or more based on the total weight of the grease. Also, it is preferable-that total amount of these additives is from 0.15 to 10 wt % based on the total weight of the grease. In particular, when the content of these additives to be incorporated exceeds 10 wt % in total, it is not only disadvantageous in that the effect corresponding to the increase of the content of these additives cannot be expected but also disadvantageous in that the content of other components decreases relatively, and these additives can be agglomerated in the grease to cause undesirable phenomena such as torque rise.

Figure 2:
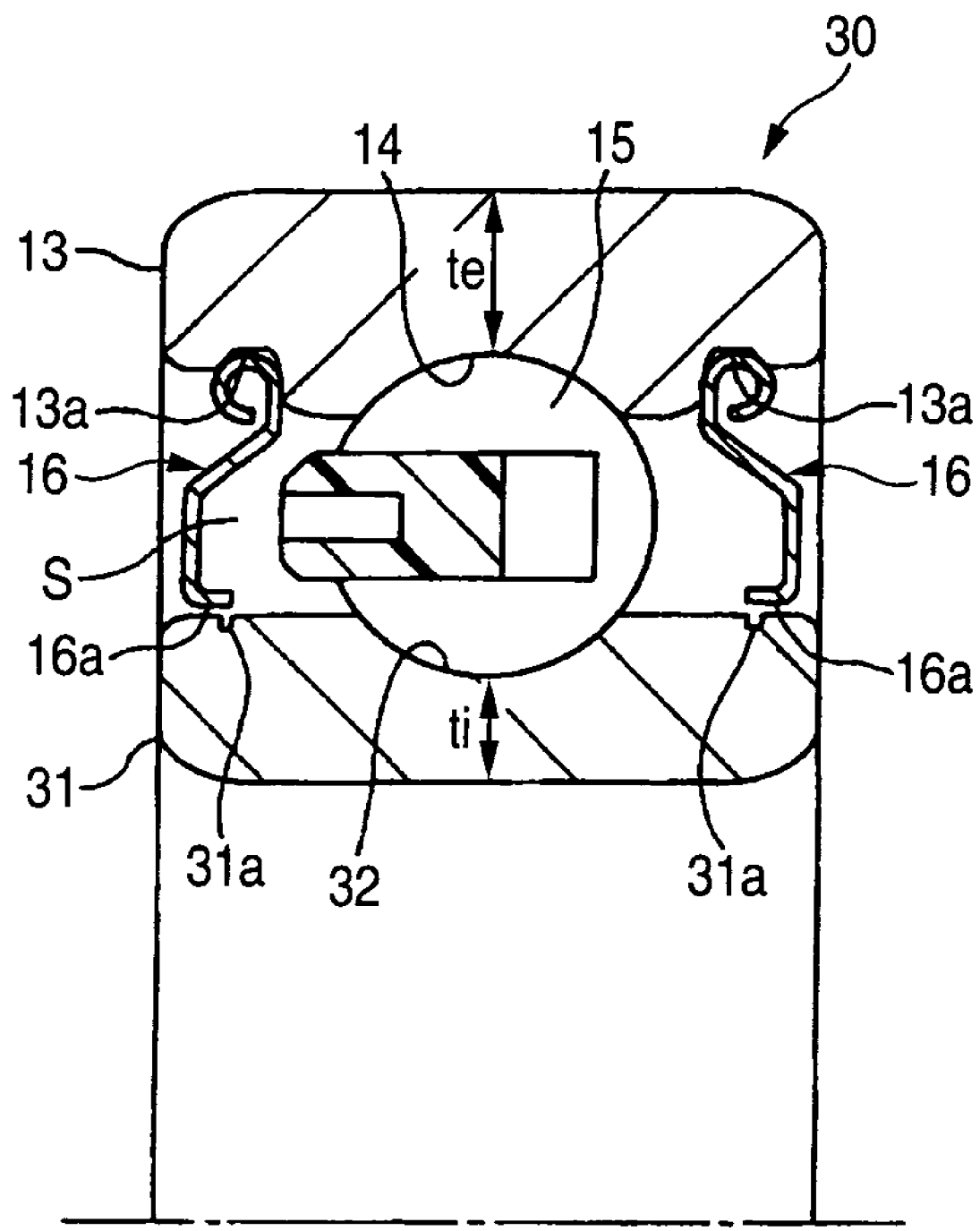
FIG. 2 is a sectional diagram illustrating a rolling bearing according to a second embodiment of the present invention.

FIG. 2 depicts a rolling bearing of the second embodiment of the present invention. In the embodiments described below, where members have the same arrangement and action as those described already, the same or corresponding signs and numeral numbers are given in the drawings to simplify or omit their description.

A rolling bearing (ball bearing) 30 shown in FIG. 2 includes a U-shaped portion (U-shaped groove) 31a provided at the same axial position on the outer surface of the inner ring 31 as the shields 16, 16. In this arrangement, the leakage of grease can be certainly prevented and the dust-proofing effect can be enhanced.

Figure 3:
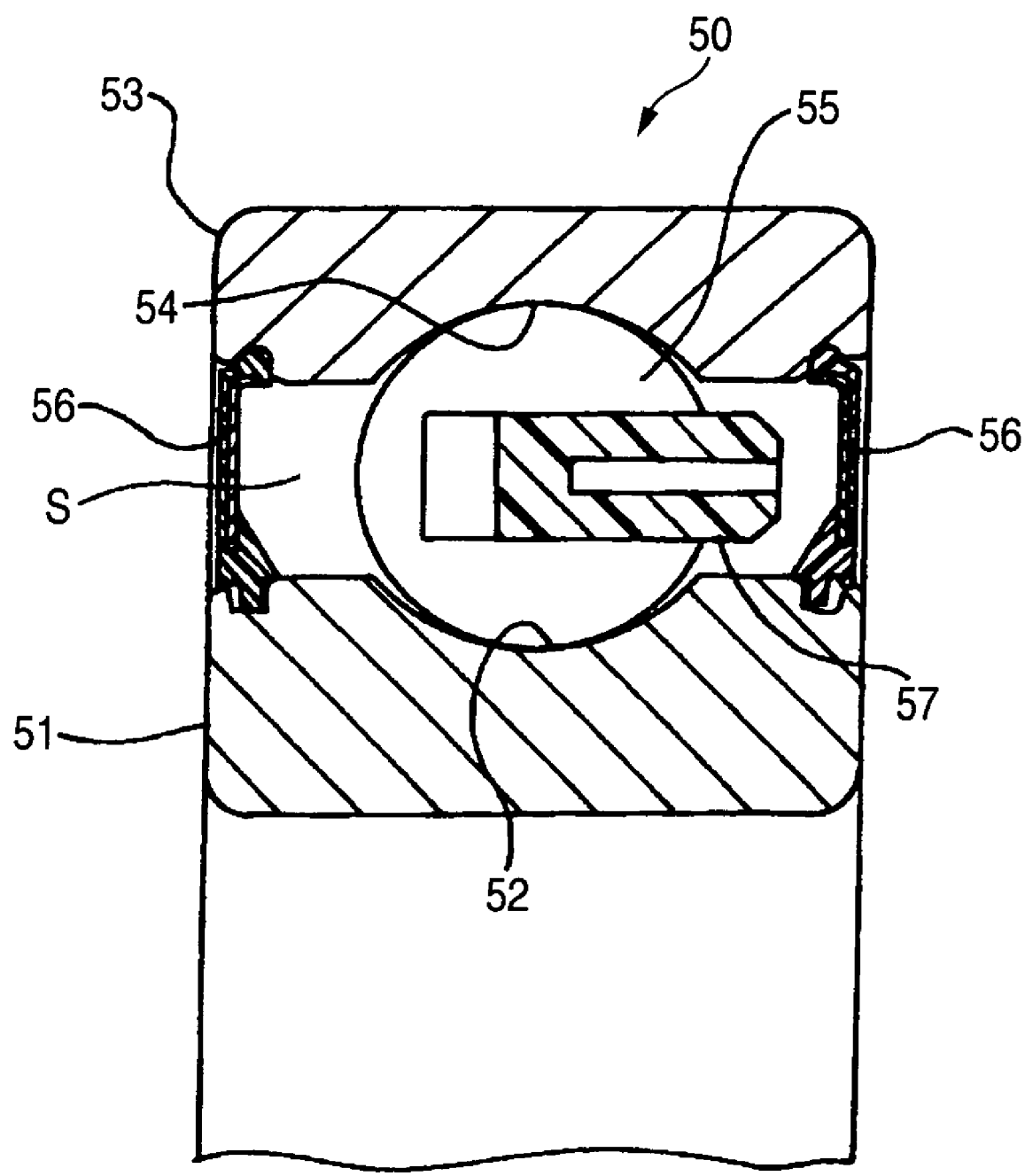
FIG. 3 is a sectional diagram illustrating a rolling bearing according to a third embodiment of the present invention.

FIG. 3 depicts a rolling bearing of the third embodiment of the present invention. A rolling bearing (ball bearing) 50 shown in FIG. 3 comprises a non-contact type sealing member 56. The sealing member 56 is formed by integrating an elastic material such as rubber with a core metal. The forward end (elastic material) of the sealing member 56 comes in sliding contact with the outer surface of the inner ring 51.

Figure 4:
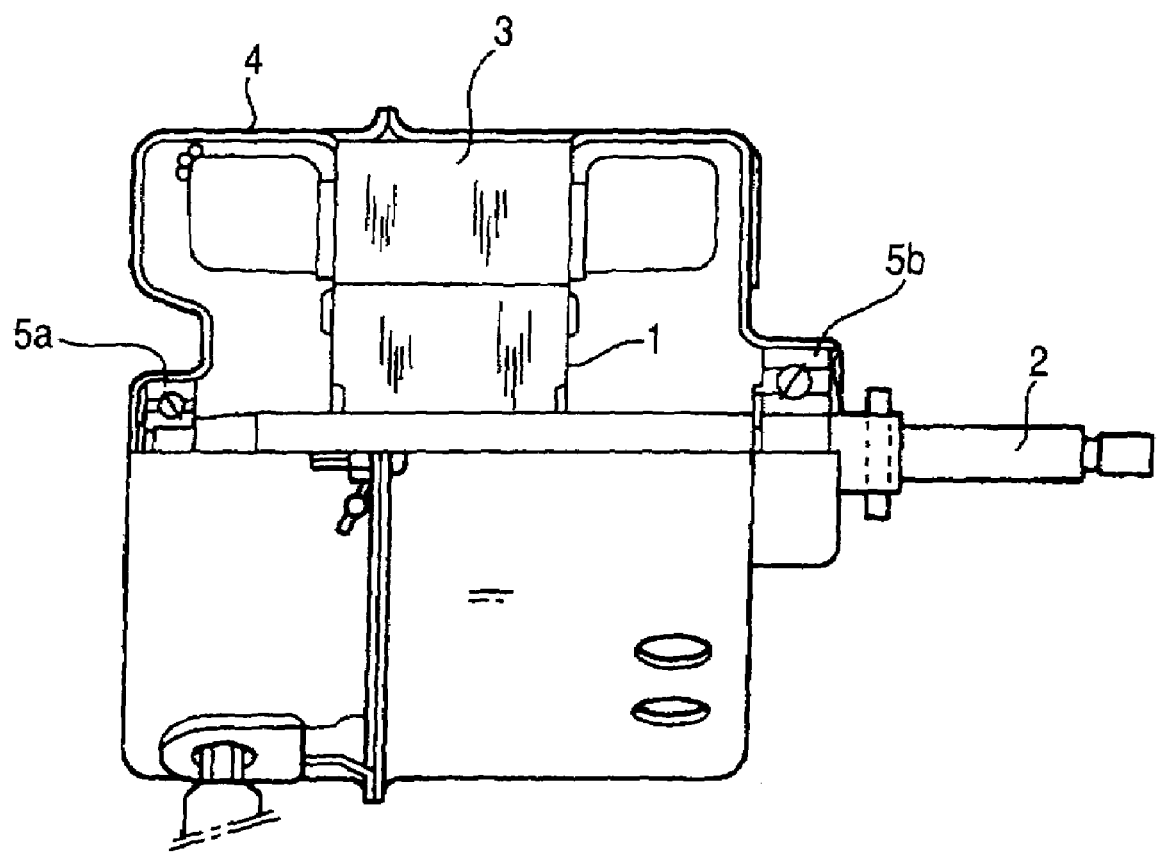
FIG. 4 is a sectional diagram illustrating a motor to which the rolling bearing according to the present invention is applied.
Figure 5:
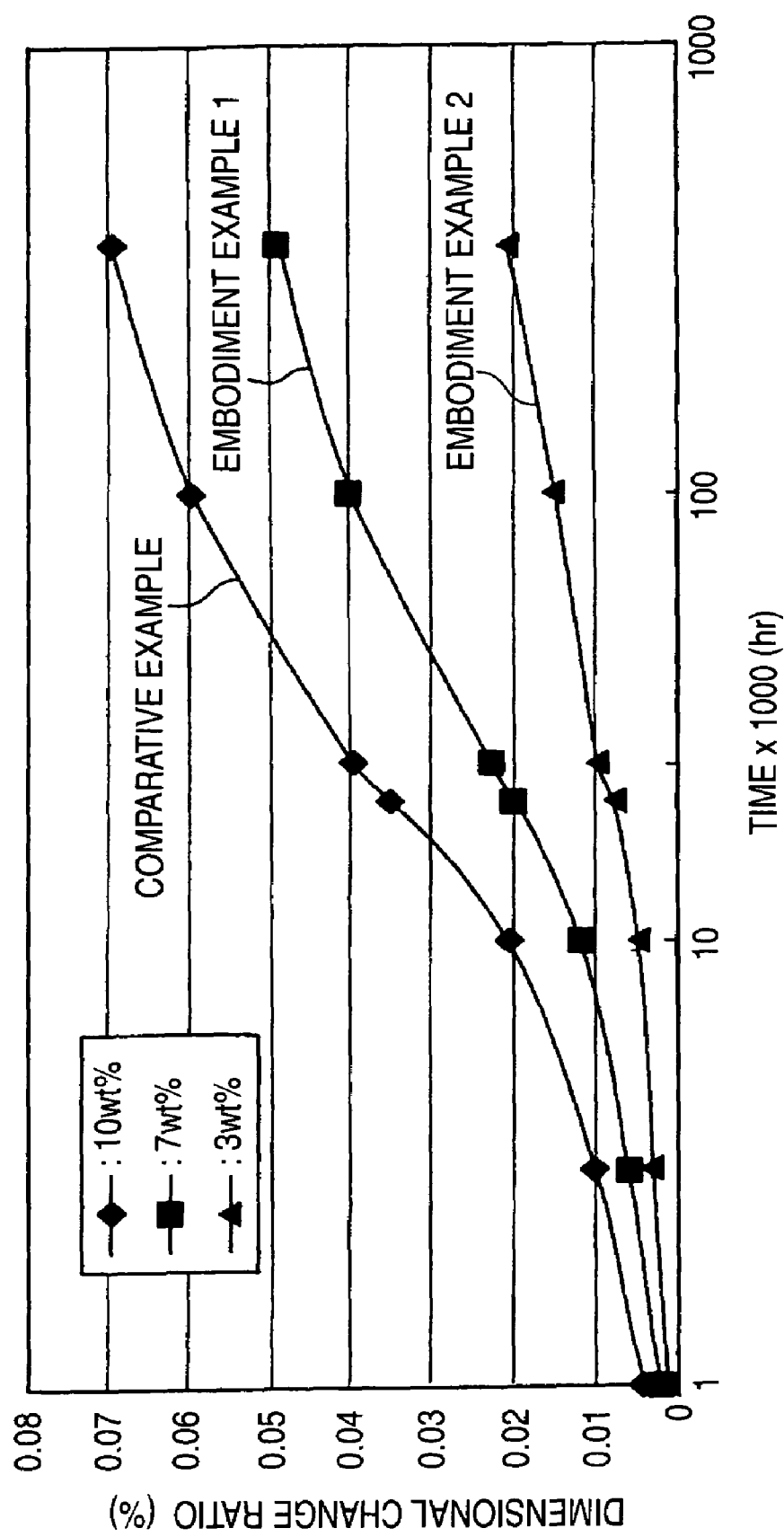
FIG. 5 is a graph illustrating the relationship between the decomposition of residual austenite and the dimensional change ratio.
Figure 6B:
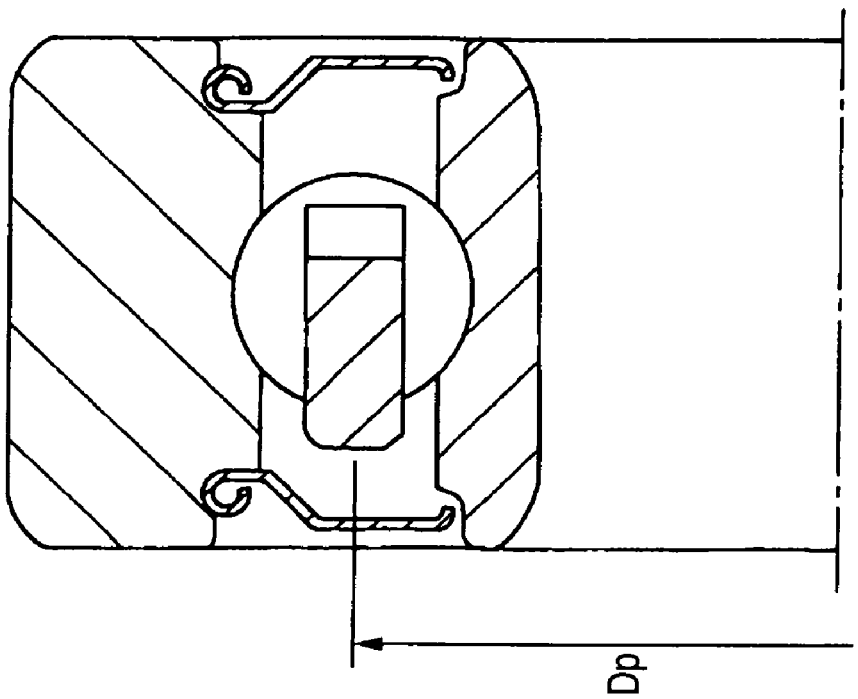
FIGS. 6A and 6B are sectional diagrams illustrating a related art rolling bearing.
Figure 6A:
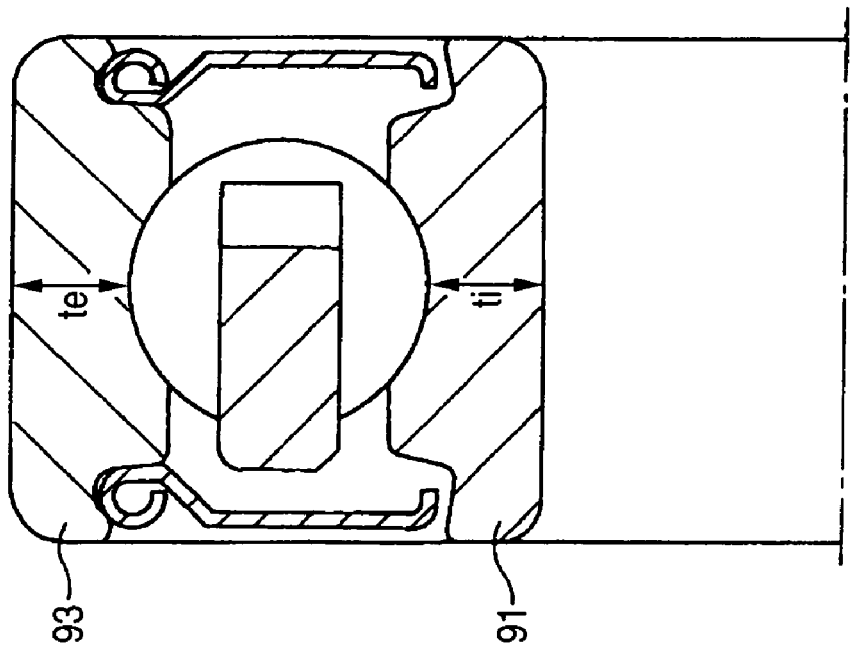

FIG. 4 depicts the configuration of a motor to which a rolling bearing (angular ball bearing) of an embodiment of the present invention is applied. The motor shown in FIG. 4 is applied to air conditioner fan motor, ventilating fan motor, cooling fan motor, etc. The motor comprises a rotor shaft 2 having a rotor 1 attached thereto, a stator core 3 provided on the periphery of the rotor shaft 2 and a case 4 having these components received therein. The rotor shaft 2 is supported at the both ends thereof by a pair of bearings 5a, 5b incorporated in the case 4. The bearing 5b has a wave washer received therein at the side thereof and the bearings 5a, 5b have a pilot pressure load applied thereto in axial direction.

The present invention is not limited to the aforementioned embodiments and proper changes and improvements can be made therein.

For example, the rolling bearing may be a double row bearing, a combined bearing or a multi-point (three-points or four-points) contact ball bearing. For example, the retainer may be a drilled retainer.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

The present application is based on a Japanese patent application (Japanese Patent Application No. 2002-253083) filed on Aug. 30, 2002 the content of which is hereby incorporated by reference.

INDUSTRIAL APPLICABILITY

A rolling bearing can be provided which has inner and outer diameters and a width corresponding to standard bearing according to ISO specification and can be affected by the effect of precision of holes in housing, etc. so difficultly that abnormal noise, vibration, etc. can be difficultly generated even in a working atmosphere of 100° C. or more.

The invention claimed is:

1. A rolling bearing for supporting a shaft on which a fan is provided comprising;
    an inner ring having an inner ring race on an outer surface thereof;
    an outer ring having an outer race on an inner surface thereof;
    a plurality of balls provided between the inner ring race and the outer ring race; and
    a retainer which keeps the balls apart each other in a circumferential direction,
    wherein an inner diameter of the bearing is set to be 3 mm or more and 17 mm or less,
    an outer diameter of the bearing is set to be 8 mm or more and 40 mm or less,
    when a thickness ti is defined between a bottom surface of the inner ring race and the inner surface of the inner ring, and a thickness te is defined between a bottom surface of the outer ring race and the outer surface of the outer ring, a relationship $te \geq 1.24\, ti$ is satisfied, and
    a residual austenite content in the inner ring is 7 wt % or less.

2. The rolling bearing according to claim 1, the rolling bearing further comprising: a sealing member provided on the inner surface of the outer ring,
    wherein a grease is enclosed in space inside the bearing.

3. The rolling bearing according to claim 2, wherein the grease is a urea-based grease.

4. A motor having the motor rotary shaft supported by the rolling bearing according to claim 2.

5. The rolling bearing according to claim 2, wherein the outer surface of the inner ring is shaped in substantially cylindrical surface at area thereof except the inner ring race.

6. The rolling bearing according to claim 2, wherein the inner diameter of the bearing, the outer diameter of the bearing and a width of the bearing are the same as the dimension of standard bearing according to ISO.

7. The rolling bearing according to claim 1, wherein the outer surface of the inner ring is shaped in substantially cylindrical surface at area thereof except the inner ring race.

8. The rolling bearing according to claim 7, wherein the inner diameter of the bearing, the outer diameter of the bearing and a width of the bearing are the same as the dimension of standard bearing according to ISO.

9. A motor having the motor rotary shaft supported by the rolling bearing according to claim 7.

10. The rolling bearing according to claim 1, wherein the inner diameter of the bearing, the outer diameter of the bearing and a width of the bearing are the same as the dimension of standard bearing according to ISO.

11. A motor having the motor rotary shaft supported by the rolling bearing according to claim 10.

12. A motor having the motor rotary shaft supported by the rolling bearing according to claim 1.

* * * * *